(12) United States Patent
Hanay

(10) Patent No.: US 10,594,343 B2
(45) Date of Patent: Mar. 17, 2020

(54) CIRCUIT ARRANGEMENT AND METHOD FOR GENERATING A RADIO-FREQUENCY, ANALOGUE TRANSMISSION SIGNAL USING REDUCED INTERFERENCE SIGNALS

(71) Applicant: RHEINISCH-WESTFÄLISCHE TECHNISCHE HOCHSCHULE AACHEN, Aachen (DE)

(72) Inventor: Oner Hanay, Aachen (DE)

(73) Assignee: RHEINISCH-WESTFRÄLISCHE TECHNISCHE HOCHSCHULE AACHEN, Aachen (DE)

( * ) Notice: Subject to any disclaimer, the term of this patent is extended or adjusted under 35 U.S.C. 154(b) by 0 days.

(21) Appl. No.: 16/073,918

(22) PCT Filed: Feb. 3, 2017

(86) PCT No.: PCT/EP2017/052433
§ 371 (c)(1),
(2) Date: Jul. 30, 2018

(87) PCT Pub. No.: WO2017/134249
PCT Pub. Date: Aug. 10, 2017

(65) Prior Publication Data
US 2019/0044556 A1   Feb. 7, 2019

(30) Foreign Application Priority Data

Feb. 4, 2016   (DE) .................... 10 2016 102 005

(51) Int. Cl.
*H04B 1/04* (2006.01)
*H04B 1/00* (2006.01)
(Continued)

(52) U.S. Cl.
CPC ....... *H04B 1/0475* (2013.01); *H04L 27/2626* (2013.01); *H04L 27/2628* (2013.01);
(Continued)

(58) Field of Classification Search
CPC .............................. H04B 1/40; H04B 1/0475; H04B 2001/0491; H04L 27/12; H04L 27/36; H04L 27/2626; H04L 27/2628
(Continued)

(56) References Cited

U.S. PATENT DOCUMENTS 6,230,022 B1 * 5/2001 Sakoda ................. H04W 52/24
455/126
7,130,361 B1   10/2006 Enderlein et al.
(Continued)

FOREIGN PATENT DOCUMENTS

EP    1089512 A1   4/2001
EP    2333994 A1   6/2011

OTHER PUBLICATIONS

International Search Report for International Application No. PCT/EP2017/052433 dated Apr. 28, 2017.
(Continued)

*Primary Examiner* — Quochien B Vuong
(74) *Attorney, Agent, or Firm* — The Dobrusin Law Firm, P.C.

(57) ABSTRACT

A circuit arrangement for generating a high-frequency, analog transmission signal, in particular a high-frequency, analog single-carrier transmission signal. The circuit arrangement has a synthesis apparatus for generating the high-frequency, analog transmission signal on the basis of a discrete frequency spectrum of a digital modulated, baseband signal. A transmission device for transmitting a high-frequency, analog transmission signal. The transmission device having an antenna for transmitting the transmission
(Continued)

signal, and a synthesis apparatus for generating the high-frequency, analog transmission signal, on a basis of a discrete frequency spectrum of a digital, modulated baseband signal. A method for transmitting a high-frequency, analog transmission signal, which is a high-frequency, analog single-carrier transmission signal. The method includes providing a discrete frequency spectrum of a modulated, digital baseband signal; generating the high-frequency, analog transmission signal on the basis of the discrete frequency spectrum; and transmitting the high-frequency, analog transmission signal by means of an antenna.

19 Claims, 8 Drawing Sheets

(51) Int. Cl.
| | | |
|---|---|---|
| H04L 27/26 | (2006.01) | |
| H04L 27/18 | (2006.01) | |
| H04L 27/02 | (2006.01) | |
| H04L 27/34 | (2006.01) | |

(52) U.S. Cl.
CPC ...... *H04B 2001/0491* (2013.01); *H04L 27/02* (2013.01); *H04L 27/18* (2013.01); *H04L 27/34* (2013.01)

(58) Field of Classification Search
USPC .......... 455/63.1, 67.13, 114.3, 118; 375/254, 375/285, 296
See application file for complete search history.

(56) References Cited

U.S. PATENT DOCUMENTS

| | | | | |
|---|---|---|---|---|
| 7,688,245 | B2* | 3/2010 | Mueck | H03M 1/1235 375/240.03 |
| 8,090,411 | B2* | 1/2012 | Korevaar | H01Q 19/08 455/67.15 |
| 8,155,248 | B2* | 4/2012 | Stirling-Gallacher | H04L 25/03191 375/341 |
| 8,258,850 | B1 | 9/2012 | Pagnanelli et al. | |
| 8,594,224 | B2* | 11/2013 | Ibi | H04L 1/0003 375/285 |
| 8,699,609 | B2* | 4/2014 | Sorrentino | H04L 5/0007 375/267 |
| 8,953,710 | B2* | 2/2015 | Nishikawa | H04L 27/2614 375/296 |
| 9,596,117 | B2* | 3/2017 | Oga | H04L 5/0007 |
| 2010/0104041 | A1 | 4/2010 | Ibi et al. | |
| 2011/0228878 | A1 | 9/2011 | Sorrentino | |
| 2015/0043324 | A1 | 2/2015 | Oga | |

OTHER PUBLICATIONS

Kammeyer—Nachrichtenübertragung; 2004; pp. 579-586.
D. Achilles; Die Fourier-Transformation in der Singalverarbeitung 1985. pp. 12-30, 64-68, 135-138.
Watanabe, Study of Saw Chirp—Z Transform for an Enhancement of OFDM/OFDMA Systems 2009; 801-806.
English Translation of the German Search Report for German Application DE201610102005, dated Sep. 26, 2017.

* cited by examiner

- Prior art -

CIRCUIT ARRANGEMENT AND METHOD FOR GENERATING A RADIO-FREQUENCY, ANALOGUE TRANSMISSION SIGNAL USING REDUCED INTERFERENCE SIGNALS

FIELD

The present invention relates to a circuit arrangement for generating a high-frequency, analog transmission signal. A further subject of the invention is a transmission device for transmitting a high-frequency transmission signal, wherein the transmission device has an antenna for transmitting the transmission signal. The invention further relates to a method for transmitting a high-frequency, analog transmission signal.

BACKGROUND

In wireless, digital communications systems, transmission devices, often referred to as transmitters, comprising a Radio Frequency Digital-to-Analog Converter (RF-DAC) are used to transmit high-frequency, analog transmission signals, which transmission devices constitute a combination of a digital-to-analog converter and a mixer. A digital baseband signal is generally fed to such RF-DACs, which digital baseband signal is initially converted to an analog signal by the RF-DAC and then transformed to a prescribed carrier frequency.

In circuit arrangements of this kind in the form of an RF-DAC, it is necessary first to oversample the digital baseband signal before the digital-to-analog conversion and then to filter said signal using a digital low-pass filter. Steep level changes of the signal can be smoothed by these measures so that the emission of undesired interference signals is reduced. In such transmission devices that are intended to be designed for digital communications system having a high bandwidth, however, the circuitry outlay for implementing the oversampling and digital filtering of the baseband signal is very high because, amongst other things, the circuits used have to be operated at a high switching frequency. The high switching frequency of the circuits for processing the baseband signal can produce glitches, which promote the emission of undesired interference signals. During transmission of signals with a high bandwidth, interference signals can therefore be suppressed only insufficiently. The RF-DAC also has to operate at a high clock frequency in order to be able to implement a correspondingly high sampling rate. This also promotes the production of glitches.

SUMMARY

Against this background, it is the object of the present invention to reduce the emission of undesired parasitic frequencies during transmission of signals with a high bandwidth.

To achieve this object, a circuit arrangement for generating a high-frequency, analog transmission signal, in particular a high-frequency, analog single-carrier transmission signal, is proposed, wherein the circuit arrangement has a synthesis apparatus for generating the high-frequency, analog transmission signal on the basis of a discrete frequency spectrum of a digital, in particular modulated, baseband signal. A transmission signal can be generated for a wired or a wireless transmission channel by means of the circuit arrangement.

A high-frequency, analog single-carrier transmission signal is understood to be a transmission signal that has precisely one carrier frequency, onto which the information to be transferred is modulated. In this respect, the high-frequency, analog single-carrier transmission signal does not have any subcarriers. Single-carrier data transmission by means of a transmission channel can be made possible using the circuit arrangement according to the invention, wherein the transmission channel has precisely one carrier frequency.

This object is also achieved by a transmission device for transmitting a high-frequency, analog transmission signal, wherein the transmission device has an antenna for transmitting the transmission signal and a synthesis apparatus for generating the high-frequency, analog transmission signal on the basis of a discrete frequency spectrum of a digital, in particular modulated, baseband signal.

According to the invention, a discrete frequency spectrum of a baseband signal is provided to the synthesis apparatus. In this respect, there is a representation of the baseband signal in the frequency domain. The signal can be transmitted from the frequency domain to the time domain by means of the synthesis apparatus, wherein frequency transformation can be carried out in such a way that a high-frequency, analog transmission signal is generated on the basis of the discrete frequency spectrum. By using a synthesis apparatus, it is not necessary to subject the digital baseband signal to oversampling and/or filtering in order to reduce parasitic emissions. The circuit arrangement for generating the high-frequency, analog transmission signal can be operated at a reduced switching frequency, as a result of which the occurrence of glitches can be reduced and the emission of undesired interference signals can be decreased.

The baseband signal can be a modulated, in particular digital, baseband signal, such as can be obtained, for example, through modulation of an, in particular digital, payload stream. The payload stream can be brought to a format adapted to the wireless transmission channel through the modulation. The modulated baseband signal can be modulated, for example, by means of one of the digital modulation methods mentioned below: Amplitude Shift Keying (ASK), Phase Shift Keying (PSK), Differential Phase Shift Keying (DPSK), Frequency Shift Keying (FSK), Quadrature Amplitude Modulation (QAM). The digital, in particular modulated, baseband signal is preferably a complex-valued baseband signal, that is to say it has a real component, which is usually referred to as I component or in-phase component, and an imaginary component, which is usually referred to as Q component or quadrature component.

According to a preferred configuration, the synthesis apparatus is an apparatus for carrying out a continuous, inverse Fourier transformation so that an analog, in particular continuous, transmission signal can be generated directly on the basis of the discrete frequency spectrum. It is therefore possible to omit a conventional, separate circuit for digital-to-analog conversion, for example a digital-to-analog converter. Instead, the synthesis apparatus provides an apparatus by means of which both transmission of the digital baseband signal present in the frequency domain to a transmission frequency range and digital-to-analog conversion can be carried out. The synthesis apparatus thus fulfills a double function.

The discrete frequency spectrum preferably has a plurality of Fourier coefficients, which are each assigned to a first frequency in a baseband range, in particular wherein in each case two first frequencies have a prescribed frequency spacing ($\Delta f$). By way of example, the frequency spectrum can have N Fourier coefficients. The N Fourier coefficients can be construed as a measure of the spectral power of the DC component of the digital baseband signal as well as of the spectral power of N−1 baseband frequencies of the digital baseband signal. The N−1 baseband frequencies can each have a spacing of $\Delta f=BW/N$, wherein BW indicates the bandwidth of the digital baseband signal. The Fourier coefficients are, in particular, complex-valued, that is to say they have a real and an imaginary component.

According to an advantageous configuration, the transmission device can have an analysis apparatus for calculating the discrete frequency spectrum on the basis of the digital baseband signal. The digital baseband signal can be converted to a discrete frequency spectrum by means of the analysis apparatus. In this respect, it is possible to transfer the digital baseband signal from the time domain into the frequency domain by means of the analysis apparatus. The analysis apparatus is preferably configured as an apparatus for carrying out a discrete Fourier transformation of the digital baseband signal. The analysis apparatus is particularly preferably an apparatus for carrying out a fast Fourier transformation (FFT), as a result of which a calculation of the discrete Fourier transformation, which calculation is efficient in terms of circuitry, can be made possible. A configuration in which the analysis device is configured as an apparatus for carrying out a discrete Fourier transformation of the digital baseband signal and the synthesis apparatus is configured as an apparatus for carrying out a continuous, inverse Fourier transformation is advantageous. It is particularly advantageous when the analysis device is configured as an apparatus for carrying out a fast Fourier transformation (FFT), in particular with a prescribed length, and the synthesis apparatus is configured as an apparatus for carrying out a continuous, inverse Fourier transformation.

According to an alternative advantageous configuration, the transmission device has a modulation apparatus for generating a discrete frequency spectrum of the digital baseband signal on the basis of a digital unmodulated payload stream. The modulation apparatus can transform a digital unmodulated payload stream directly to a modulated digital, in particular complex-valued, baseband signal, which is present in the frequency domain, that is to say, in particular, in the form of Fourier coefficients. In this case, the modulation apparatus can apply one of the modulation methods listed below to the payload stream: Amplitude Shift Keying (ASK), Phase Shift Keying (PSK), Differential Phase Shift Keying (DPSK), Frequency Shift Keying (FSK), Quadrature Amplitude Modulation (QAM).

An advantageous configuration makes provision for the synthesis apparatus to have a plurality of signal sources, in particular a plurality of current sources, by means of which periodic signals can be generated at two frequencies in a frequency range that is raised compared to the baseband range, in particular wherein in each case two second frequencies have the prescribed frequency spacing. The prescribed frequency spacing can be $\Delta f=BW'/N$, wherein BW' is the bandwidth of the digital baseband signal.

It is also advantageous when the synthesis apparatus has a plurality of weighting devices by means of which the weighting of the signal sources can be set depending on the discrete frequency spectrum so that a plurality of signal components of a high-frequency, analog signal, in particular the high-frequency, analog signal, can be generated, in particular wherein in each case two signal components have the prescribed frequency spacing. The weighting devices can be configured as amplifying devices. Precisely one weighting device is preferably assigned in each case to a signal source, for example a current source, which weighting device can be controlled by means of precisely one Fourier coefficient. The current generated by the current source can be modulated by means of the weighting device. In order to obtain an analog transmission signal at a frequency that is raised in comparison with the digital baseband signal, frequency transformation can be carried out by virtue of a Fourier coefficient of a first frequency in the baseband range being used for weighting of a second frequency the frequency range that is raised compared to the baseband range, wherein the second frequency is raised by a prescribed frequency constant compared to the first frequency.

In this connection, it is preferred when the raised frequency range is an intermediate frequency range located between the baseband range and the range of the transmission frequencies and wherein the synthesis apparatus has a mixer stage, in which the periodic signal can be mixed at two frequencies using an analog oscillator signal generated depending on the discrete frequency spectrum so that a plurality of signal components of the high-frequency, analog transmission signal can be generated. In this respect, signal components of a high-frequency, analog signal can be synthesized in the intermediate frequency range, which signal can be up-converted to the range of the transmission frequencies in order to form the high-frequency, analog transmission signal in each case using a weighted, analog oscillator signal.

The signal sources preferably have an apparatus for direct digital synthesis (DDS) of the periodic signal. By means of an apparatus of this kind, an analog, periodic signal can generated by switching elements, which process digital signals so that is it not necessary to provide a plurality of oscillators, which could interfere with one another, as part of the synthesis apparatus. By using signal sources that each have an apparatus for direct digital synthesis of the periodic signal, it becomes possible to generate a multiplicity of periodic signals at a prescribed frequency spacing, wherein it is possible to reduce mutual interference of the periodic signals.

The circuit arrangement is preferably configured as an integrated circuit arrangement. In particular, the analysis apparatus and the synthesis apparatus can be formed on a common substrate. It is also possible for the modulation apparatus and the synthesis apparatus to be formed on a common substrate.

According to an advantageous configuration, the transmission device also has an amplifier arranged between the synthesis apparatus and the antenna, by means of which amplifier the transmission signal can be amplified. As an alternative or in addition, an analog filter can be provided at the input of the antenna in order to additionally suppress the emission of interference signals.

According to the invention, the circuit arrangement described above for generating a transmission signal, in particular a high-frequency, analog single-carrier transmission signal, can be used in a transmission frequency band above 57 GHz, preferably in a range of from 57 GHz to 66 GHz. In particular, the described circuit arrangement is suitable for generating transmission signals according to the standard IEEE 802.11ad in force on the priority day of this application. According to the invention, there is also provision for the transmission device described above for transmitting a high-frequency, analog transmission signal, in particular a high-frequency, analog single-carrier transmission signal, to be used in a transmission frequency band above 57 GHz, preferably in a range of from 57 GHz to 66

GHz, preferably for transmitting transmission signal according to the standard IEEE 802.11ad in force on the priority day of this application.

To achieve the object mentioned at the beginning, a method for generating a high-frequency, analog transmission signal, which is, in particular, a high-frequency, analog single-carrier transmission signal, is also proposed, which method has the following method steps:

providing a discrete frequency spectrum of an, in particular modulated, digital baseband signal;

generating the high-frequency, analog transmission signal on the basis of the discrete frequency spectrum; and transmitting the high-frequency, analog transmission signal by means of an antenna.

In the method according to the invention, the digital baseband signal is provided as a discrete frequency spectrum. In a further step, the signal is transmitted from the frequency domain to the time domain, wherein frequency transformation is carried out in such a way that a high-frequency, analog transmission signal is generated on the basis of the discrete frequency spectrum. In said method, oversampling and/or filtering of the digital baseband signal can be omitted, as a result of which the emission of undesired parasitic frequencies during transmission of signals having a high bandwidth can be reduced.

It is advantageous when wherein one of the two method steps mentioned below is carried out for providing the high-frequency, analog transmission signal:

calculating the discrete frequency spectrum of the digital baseband signal on the basis of the digital baseband signal, in particular by means of a discrete Fourier transformation; or generating the discrete frequency spectrum of the digital baseband signal proceeding from a digital unmodulated payload stream.

By calculating the discrete frequency spectrum on the basis of the, in particular modulated, digital baseband signal, for example by applying a discrete Fourier transformation to the digital baseband signal, it is possible to generate a representation of the digital baseband signal in the frequency domain. As an alternative, such a representation in the frequency domain can be derived directly from an unmodulated payload stream in which a combined modulation and transformation to the frequency domain is carried out proceeding from the payload stream.

In this respect, the digital baseband signal is transmitted from the time domain to the frequency domain.

It is advantageous when the discrete frequency spectrum of the digital baseband signal is provided by means of an apparatus for carrying out a discrete Fourier transformation and the high-frequency, analog transmission signal is generated on the basis of the discrete frequency spectrum by means of an apparatus for carrying out a continuous, inverse Fourier transformation. It is particularly advantageous when the provision of the discrete frequency spectrum of the digital baseband signal is configured by means of an apparatus for carrying out a fast Fourier transformation (FFT), in particular with a prescribed length, and the high-frequency, analog transmission signal is generated on the basis of the discrete frequency spectrum by means of an apparatus for carrying out a continuous, inverse Fourier transformation.

One advantageous configuration makes provision for the calculation of the discrete frequency spectrum of the digital baseband signal to be preceded by windowing of the digital baseband signal. It is particularly advantageous when a plurality of, in particular two, temporally overlapping sections of the baseband signal are used to calculate the discrete frequency spectrum. It is possible to calculate a plurality of, in particular two, discrete partial frequency spectra from the temporally overlapping sections of the baseband signal. The discrete partial frequency spectra are preferably combined in a further step to form the discrete frequency spectrum of the digital baseband signal.

According to an advantageous configuration of the method, the discrete frequency spectrum has a plurality of Fourier coefficients, which are each assigned to a first frequency in a baseband range, in particular wherein in each case two first frequencies have a prescribed frequency spacing, wherein periodic signals are generated at two frequencies in a frequency range that is elevated compared to the baseband range, in particular wherein in each case two second frequencies have the prescribed frequency spacing wherein signal components of the high-frequency, analog transmission signal are generated on the basis of the periodic signals and the Fourier coefficients, in particular wherein in each case two signal components have the prescribed frequency spacing. A frequency shift is produced, which is carried out in the frequency domain so that a frequency shift is not required in the time domain, for example by a mixer.

In this connection, it is preferred when the raised frequency range is a transmission frequency range and the generated signal components are summed to generate the high-frequency, analog transmission signal. In order to generate the high-frequency, analog transmission signal at a frequency that is raised in comparison with the digital baseband signal, frequency transformation can thus be carried out by virtue of a Fourier coefficient of a first frequency in the baseband range being used for weighting of a second frequency the frequency range that is raised compared to the baseband range, wherein the second frequency is raised by a prescribed frequency constant compared to the first frequency.

According to an alternative, preferred configuration of the method, the raised frequency range is an intermediate frequency range located between the frequency range of the baseband signal the frequency range of the transmission signal and wherein a common oscillator signal (LO) is additionally used to generate the signal components of the high-frequency, analog transmission signal, wherein the frequency of the common oscillator signal is located in a range below the frequency range of the transmission signal. In this respect, signal components of a high-frequency, analog signal can be synthesized in the intermediate frequency range, which signal can be up-converted to form the high-frequency, analog transmission signal using the common oscillator signal in the range of the transmission frequencies.

As an alternative or in addition, in the method, the advantageous configurations described in connection with the transmission device and/or the circuit arrangement can also be applied.

Further details, features and advantages of the invention will emerge from the drawings and from the following description of a preferred embodiment on the basis of the drawings. In this case, the drawings illustrate only an exemplary embodiment of the invention, which does not restrict the concept of the invention.

DETAILED DESCRIPTION

In the various figures, identical parts are always provided with the same reference signs and are therefore generally also each only mentioned once.

Figure 1:
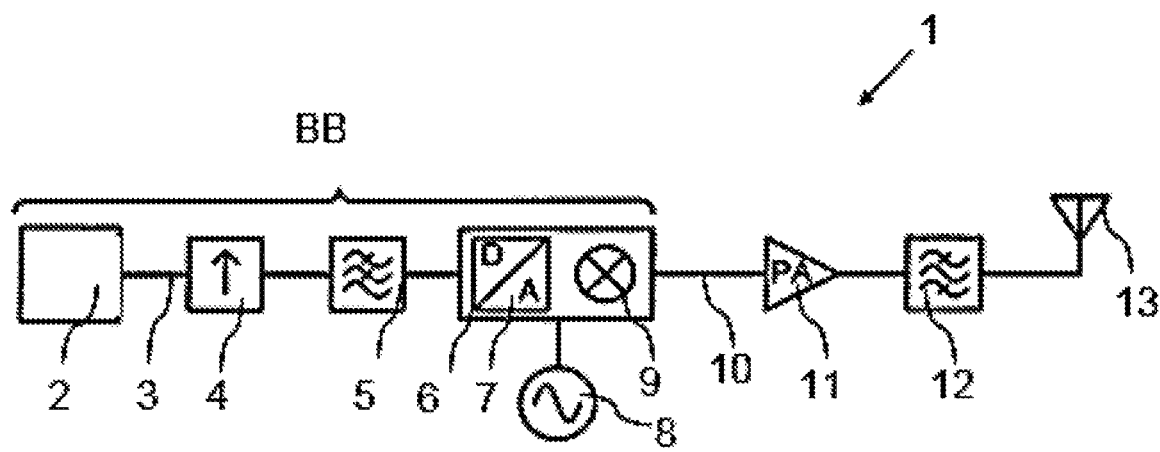
FIG. 1 shows a transmission device according to the prior art.

FIG. 1 shows a transmission device 1 for transmitting a high-frequency, analog transmission signal 10 according to the prior art, which transmission device is configured as an RF transmitter, wherein the elements of the transmission device 1 that process signals in the baseband are characterized by the reference sign BB.

The transmission device 1 has a modulation device 2, by means of which a digital baseband signal 3 is provided. The digital baseband signal 3 is oversampled in a sampling apparatus 4, that is to say the sampling is carried out at a sampling rate that is higher than the Nyquist frequency of the baseband signal 3. The oversampled baseband signal is fed to a digital low-pass filter 5 in order to smooth steep level changes of the signal. The oversampled and low-pass-filtered baseband signal is then subjected to digital-to-analog conversion and to frequency transformation to a carrier frequency in an RF-DAC 6. The RF-DAC 6 has a digital-to-analog converter 7 and a mixer 9 for this purpose. The carrier frequency is provided by means of an oscillator 8.

The RF-DAC 7 generates a high-frequency, analog transmission signal 10, which is amplified by means of an amplifier 11. The amplified transmission signal is filtered into an analog filter 12 and then emitted by means of an antenna 13. The high-frequency, analog transmission signal 10 is a high-frequency, analog single-carrier transmission signal 10.

The transmission device 1 shown in FIG. 1 has the disadvantage that the circuitry outlay for implementing the oversampling and digital filtering of the baseband signal is very high. The high switching frequency of the circuits for processing the baseband signal also produces glitches, which promote the emission of undesired interference signals. The RF-DAC also has to operate at a high clock frequency in order to be able to implement a correspondingly high sampling rate. This also promotes the production of glitches.

Figure 2:
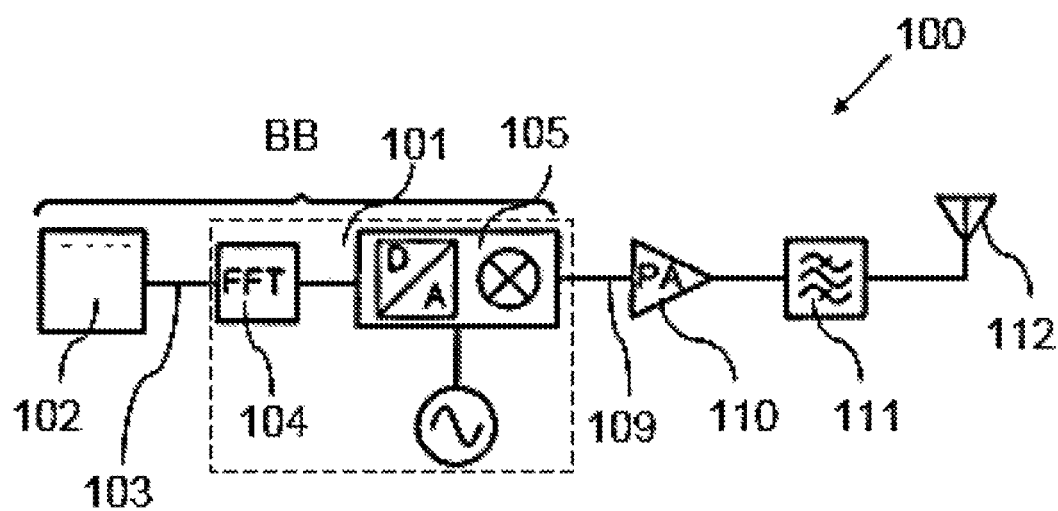
FIG. 2 shows a transmission device for transmitting a high-frequency, analog transmission signal according to a first exemplary embodiment of the invention.

FIG. 2 shows a transmission device 100 according to a first exemplary embodiment of the invention. Such elements of the transmission device 1 that process signals in the baseband are characterized by the reference sign BB.

The transmission device 100 is configured as an RF transmitter and has a circuit arrangement 101 for generating a high-frequency, analog transmission signal 109 and an antenna 112, by means of which the transmission signal can be emitted. Part of the transmission device 100 is also a conventional modulator 102, by means of which a digital baseband signal 103 is provided, for example a complex, digital baseband signal, which has a real component (I component) and an imaginary component (Q component). The modulator 102 generates the digital, modulated baseband signal 103 from an unmodulated payload stream. The modulator 102 can be, for example, a QAM modulator.

The circuit arrangement 101 comprises an analysis apparatus 104 for calculating a discrete frequency spectrum of the baseband signal 103 and a synthesis apparatus 105 for generating the high-frequency, analog transmission signal on the basis of the discrete frequency spectrum. A method in which a discrete frequency spectrum of the digital baseband signal 103 is calculated by means of the analysis apparatus 104 and a high-frequency, analog transmission signal 109, in particular a high-frequency, analog single-carrier transmission signal is generated on the basis of the calculated discrete frequency spectrum can thus be carried out by means of the circuit arrangement 101. It is not necessary to subject the digital baseband signal 103 to oversampling and/or filtering in order to reduce parasitic emissions. The circuit arrangement 101 can be operated at a reduced switching frequency, as a result of which the occurrence of glitches can be reduced and the emission of undesired interference signals can be decreased.

In the circuit arrangement 101 according to the first exemplary embodiment, the analysis apparatus 104 is configured as an apparatus for carrying out a discrete Fourier transformation, in particular for carrying out a fast Fourier transformation (FFT). The analysis apparatus 104 samples in each case N symbols of the digital baseband signal 103 in the time domain and calculates a discrete frequency spectrum for these N symbols, which discrete frequency spectrum has N Fourier coefficients $c_0, c_1, \ldots, c_{N-1}$ (N-point-FFT). The N Fourier coefficients represent a measure of the spectral power of the DC component of the baseband signal 103 and of N−1 baseband frequencies of the baseband signal 103, wherein the N−1 baseband frequencies each have a spacing of $\Delta f = BW'/N$, wherein BW' is the bandwidth of the digital baseband signal. The Fourier coefficients constitute a representation of the baseband signal 103 in the frequency domain.

Figure 3:
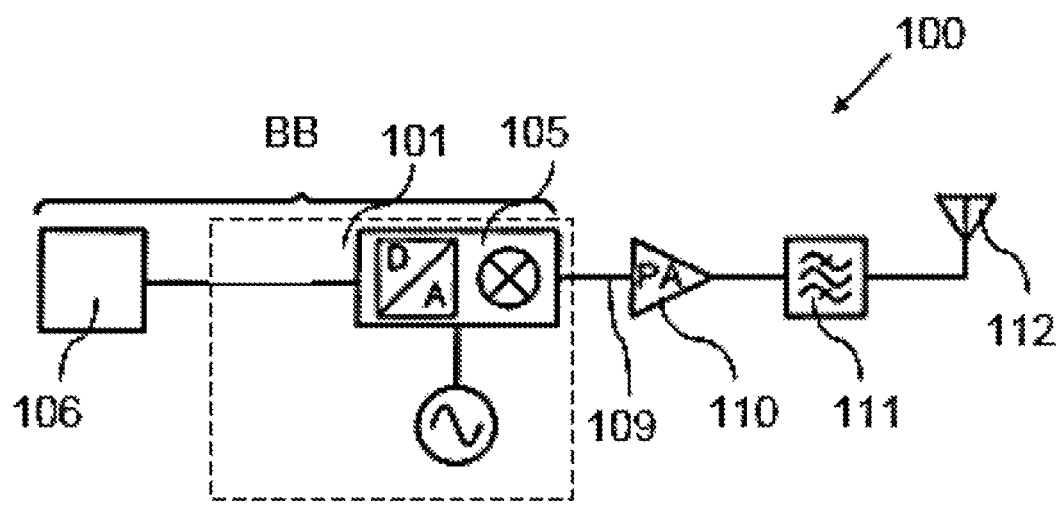
FIG. 3 shows a transmission device for transmitting a high-frequency, analog transmission signal according to a second exemplary embodiment of the invention.

FIG. 3 shows a second exemplary embodiment of a transmission device 100 according to the invention. The transmission device 100 corresponds in large parts to the transmission device of the first exemplary embodiment. In contrast to the first exemplary embodiment, this transmission device 100 has a modulation device 106, by means of which a discrete frequency spectrum of the digital baseband 103 is generated directly from a digital, unmodulated payload stream. In the transmission device 100 according to the second exemplary embodiment, a separate analysis apparatus is therefore not required since the digital, modulated baseband signal 103 is provided directly in the frequency domain.

In the transmission devices 100 described above, the circuit arrangement 101 can be configured as an integrated circuit arrangement. The transmission devices 100 also have an amplifying device 110 for amplifying the transmission signal 109 and an analog filter 111, which are arranged in the signal flow between the synthesis apparatus 105 and the antenna 112. The amplifying device 110 and/or the analog filter 111 and/or the modulator 102 and/or the modulation device 116 can be be configured as part of the circuit arrangement 101 in a modification of the exemplary embodiments illustrated in FIGS. 2 and 3. As an alternative, the amplifying device 110 and/or the analog filter 111 and/or the modulator 102 and/or the modulation device 116 can be provided as elements that are separate from the circuit arrangement 101.

The configuration of the synthesis apparatus 105 will be dealt with in more detail below. These embodiments can be applied to all of the exemplary embodiments of the transmission device 100 that are explained above.

Figure 5:
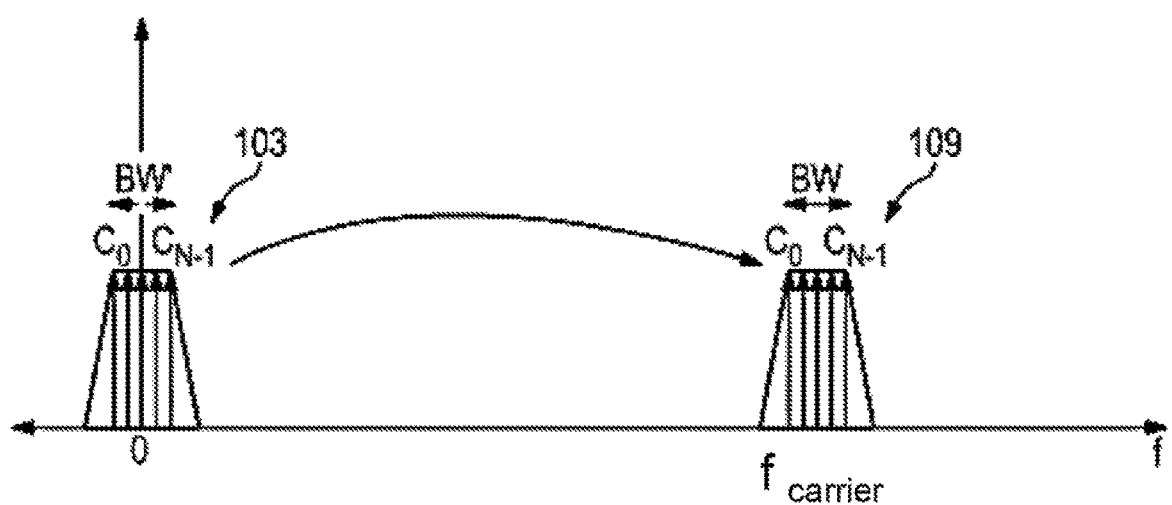
FIG. 5 shows a spectral diagram for illustrating the frequency shift in the frequency range.

The synthesis apparatus 105 of the circuit arrangement 101 is designed as an apparatus for carrying out a continuous, inverse Fourier transformation. The synthesis apparatus 105—similarly to in an RF-DAC—converts the digital baseband signal 104 to a continuous, analog transmission signal 109, in particular a single-carrier transmission signal, and shifts the frequency to a transmission frequency band, which is shifted from the baseband by a prescribed frequency constant $f_c$. In contrast to the RF-DAC 6 shown in FIG. 1, the discrete frequency spectrum calculated by the analysis apparatus 104 is fed to the synthesis apparatus 105 in the form of the Fourier coefficients $c_0, c_1, \ldots c_{N-1}$ instead of a digital baseband signal in the time domain. Frequencies in the transmission frequency band are assigned to said Fourier coefficients $c_0, c_1, \ldots c_{N-1}$, which frequencies each have a spacing of $\Delta f$ with respect to one another and are shifted with respect to the corresponding frequencies from the baseband range by the prescribed frequency constant $f_c$, as is illustrated in FIG. 5 for clarification. In this respect, the synthesis apparatus can be referred to as an RF-FAC (Radio Frequency Fourier-to-Analog Converter), which transmits the baseband signal from the frequency domain back to the time domain and in the process carries out frequency transformation to the transmission frequency band.

Figure 4:
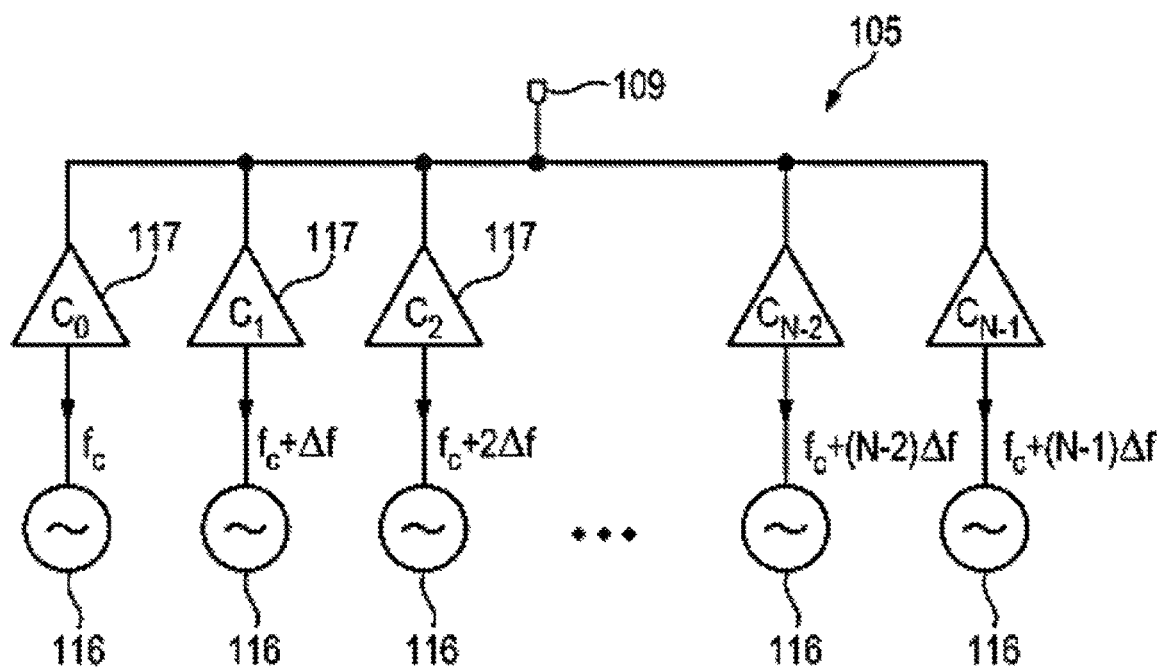
FIG. 4 shows a block diagram of a first exemplary embodiment of a synthesis apparatus for generating a high-frequency, analog transmission signal depending on a digital baseband signal.

FIG. 4 shows a block circuit diagram of the synthesis apparatus 105. The synthesis apparatus 105 has a total of N signal sources 116 configured as current sources, which provide sinusoidal currents at the transmission frequencies $f_c, f_c+\Delta f, f_c+2\Delta f, \ldots, f_c+(N-2)\Delta f, f_c+(N-1)\Delta f$. The sinusoidal current of each signal source 116 is modulated by means of in each case a weighting device 117 designed as an amplifying device so that the ratio of the sinusoidal currents to one another can be set. The weighting in the weighting devices 117 is effected depending on the Fourier coefficients $c_0, c_1, \ldots c_{N-1}$, wherein a Fourier coefficient $c_0, c_1, \ldots c_{N-1}$ is assigned to each weighting device 117. The Fourier coefficient $c_0, c_1, \ldots c_{N-1}$ of a baseband frequency is in this case assigned to a transmission frequency that results from addition of a prescribed frequency constant $f_c$ and the respective baseband frequency.

As can further be seen from the illustration in FIG. 4, the weighting devices 117 are connected to a common output of the synthesis apparatus 105 at which the generated transmission signal 109 is available. The transmission signal 109 results here from summing of the weighted currents of the individual signal sources 116. A plurality of signal components of the high-frequency, analog transmission signal 109, in particular of the high-frequency, analog single-carrier transmission signal, are thus generated, wherein in each case two signal components have the prescribed frequency spacing $\Delta f$. The summation current obtained is a reconstruction of the baseband time signal, which reconstruction is shifted to the transmission frequency band, wherein the transitions between the individual symbols are sinusoidal. The bandwidth BW of the transmission signal 109 corresponds to the bandwidth BW' of the baseband signal 103, cf. also FIG. 5.

To transmit N symbols, the Fourier coefficients $c_0, c_1, \ldots c_{N-1}$ are each used once so that the switching frequency of the synthesis apparatus 105, in particular of the weighting apparatuses 117, is comparatively low.

Figure 6:
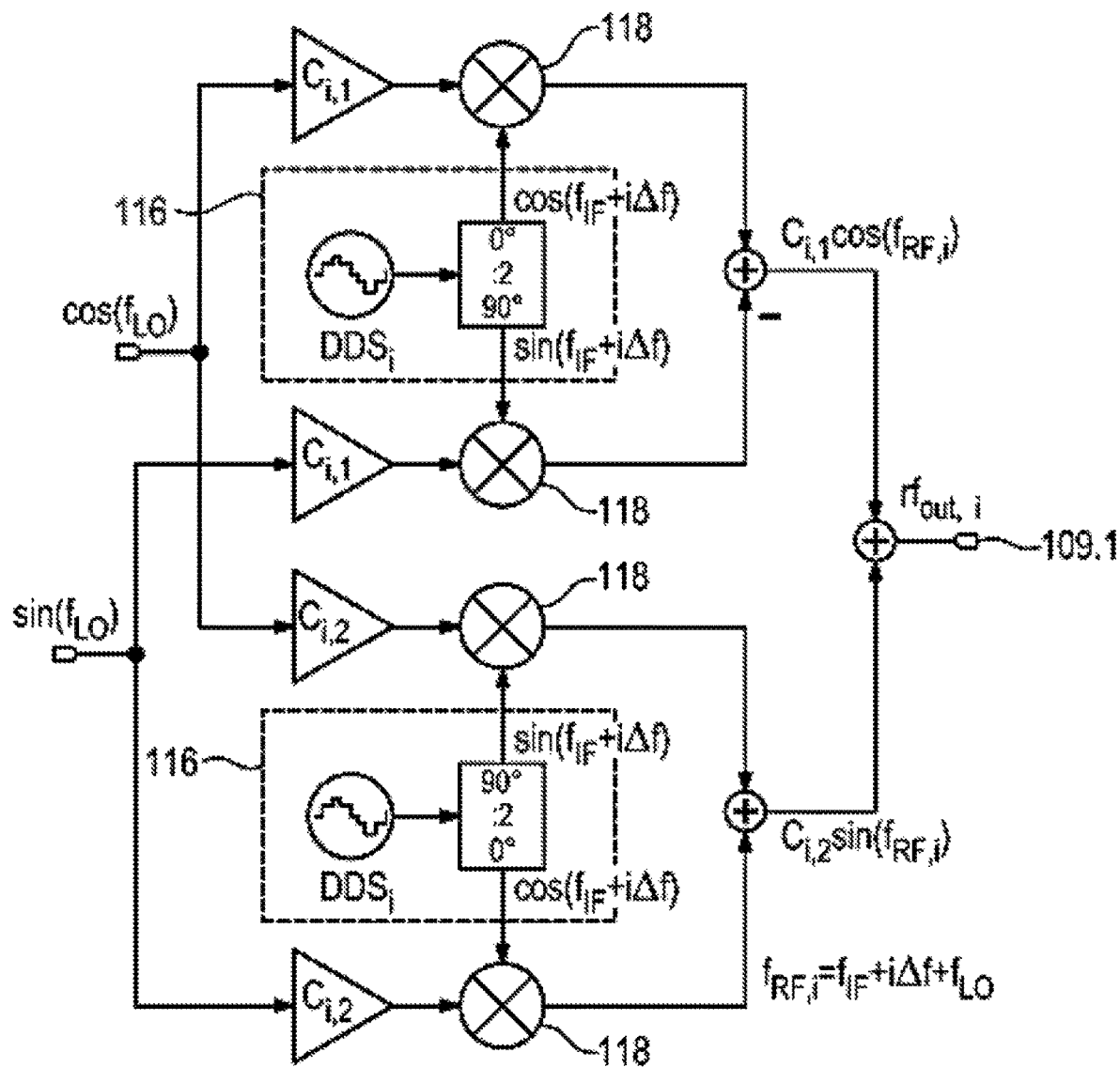
FIG. 6 shows a block diagram of a second exemplary embodiment of a synthesis apparatus for generating a high-frequency, analog transmission signal depending on a digital baseband signal.

FIG. 6 shows a block circuit diagram of a second exemplary embodiment of a synthesis apparatus 105, wherein the block circuit diagram comprises the elements that are required to generate precisely one signal component 109.1 of the high-frequency, analog transmission signal 109 from complex-valued Fourier coefficients having a real part $c_{i,1}$ and an imaginary part $c_{i,2}$. This means that the synthesis apparatus 105 comprises a total of N-times the design shown in FIG. 6. The signal components 109.1 are then summed to form the high-frequency, analog transmission signal 109.

In said synthesis apparatus 105, periodic signals are generated in a raised frequency range, which is an intermediate frequency range located between the baseband range and the range of the transmission frequencies. In this respect, the baseband signal is first transformed to an intermediate frequency range and then to the transmission frequency range. First, the real part $c_{i,1}$ and the imaginary part $c_{i,2}$ of the complex-valued Fourier coefficients are multiplicatively mixed using in each case a first oscillator signal $\cos(f_{LO})$ and a second oscillator signal $\sin(f_{LO})$ that is phase-shifted with respect to the first oscillator signal by 90°. The first oscillator signal $\cos(f_{LO})$ and the second oscillator signal $\sin(f_{LO})$ constitute two common oscillator signals, which are used to generate all of the signal components 109.1 of the high-frequency, analog transmission signal 109. The frequency of the first oscillator signal $\cos(f_{LO})$ and of the second oscillator signal $\sin(f_{LO})$ is identical and is located below the transmission frequency of the transmission signal 109. In this respect, the following intermediate-frequency signals are formed: a first intermediate-frequency signal is formed from the first oscillator signal $\cos(f_{LO})$ and the real part $c_{i,1}$ of the Fourier coefficient. A second intermediate-frequency signal is generated from the second oscillator signal $\sin(f_{LO})$ and the real part $c_{i,1}$ of the Fourier coefficient. A third intermediate-frequency signal is also formed from the first oscillator signal $\cos(f_{LO})$ and the imaginary part $c_{i,2}$ of the complex-valued Fourier coefficients. A fourth intermediate-frequency signal is generated from the second oscillator signal $\sin(f_{LO})$ and the imaginary part $c_{i,2}$.

The synthesis apparatus 105 further comprises a plurality of signal sources 116 for generating the periodic signals, which are generated in a frequency range that is raised in comparison to the baseband range. The signal sources 116 each have an apparatus for direct digital synthesis (DDS) of the periodic signals, which is subsequently referred to as DDS apparatus. Each DDS apparatus generates a periodic DDS signal at a prescribed frequency proceeding from a digital counter. A first analog, periodic signal $\cos(f_{IF}+i\Delta F)$ and a second analog, second periodic signal $\sin(f_{IF}+i\Delta F)$ that is phase-offset compared to the first periodic signal $\cos(f_{IF}+i\Delta F)$ by 90° is derived from said DDS signal, which signals both have half the frequency of the DDS signal. Two of the periodic signals $\cos(f_{IF}+i\Delta F)$, $\sin(f_{IF}+i\Delta F)$ generated in the signal sources 116 each have the prescribed frequency spacing N. The periodic signals $\cos(f_{IF}+i\Delta F)$, $\sin(f_{IF}+i\Delta F)$ are mixed in a mixer stage comprising a plurality of mixers 118 each having one of the intermediate-frequency signals. The first intermediate-frequency signal and the fourth intermediate-frequency signal are each mixed with the first periodic signal $\cos(f_{IF}+i\Delta F)$. Furthermore, the second intermediate-frequency signal and the third intermediate-frequency signal are mixed with the second analog, periodic signal $\sin(f_{IF}+i\Delta F)$. The mixed products obtained in this way are linked in such a way that the lower sideband in the transmission signal component 109.1 is suppressed so that a HF signal $HF_{OSB}$ is obtained, which contains exclusively the upper sideband. The linking satisfies the equation $$HF = ZF1 \cdot \cos(f_{IF}+i\Delta F) \mp ZF2 \cdot \sin(f_{IF}+i\Delta F) + ZF3 \cdot \sin(f_{IF}+i\Delta F) \pm ZF4 \cdot \cos(f_{IF}+i\Delta F),$$

wherein HF is the HF signal, ZF1 is the first intermediate-frequency signal, ZF2 is the second intermediate-frequency signal, ZF3 is the third intermediate-frequency signal, ZF4 is the fourth intermediate-frequency signal, $\cos(f_{IF}+i\Delta F)$ is the first analog, periodic signal and $\sin(f_{IF}+i\Delta F)$ is the second analog, periodic signal. In this way, it can be ensured that the generated transmission signal 109 has only frequency components either in the upper or in the lower sideband, since either those signals that generate frequency components in the lower sideband or those signals that generate frequency components in the upper sideband cancel each other out. It is therefore possible to omit filtering of the transmission signal in order to suppress the upper or lower sideband.

Figure 7:
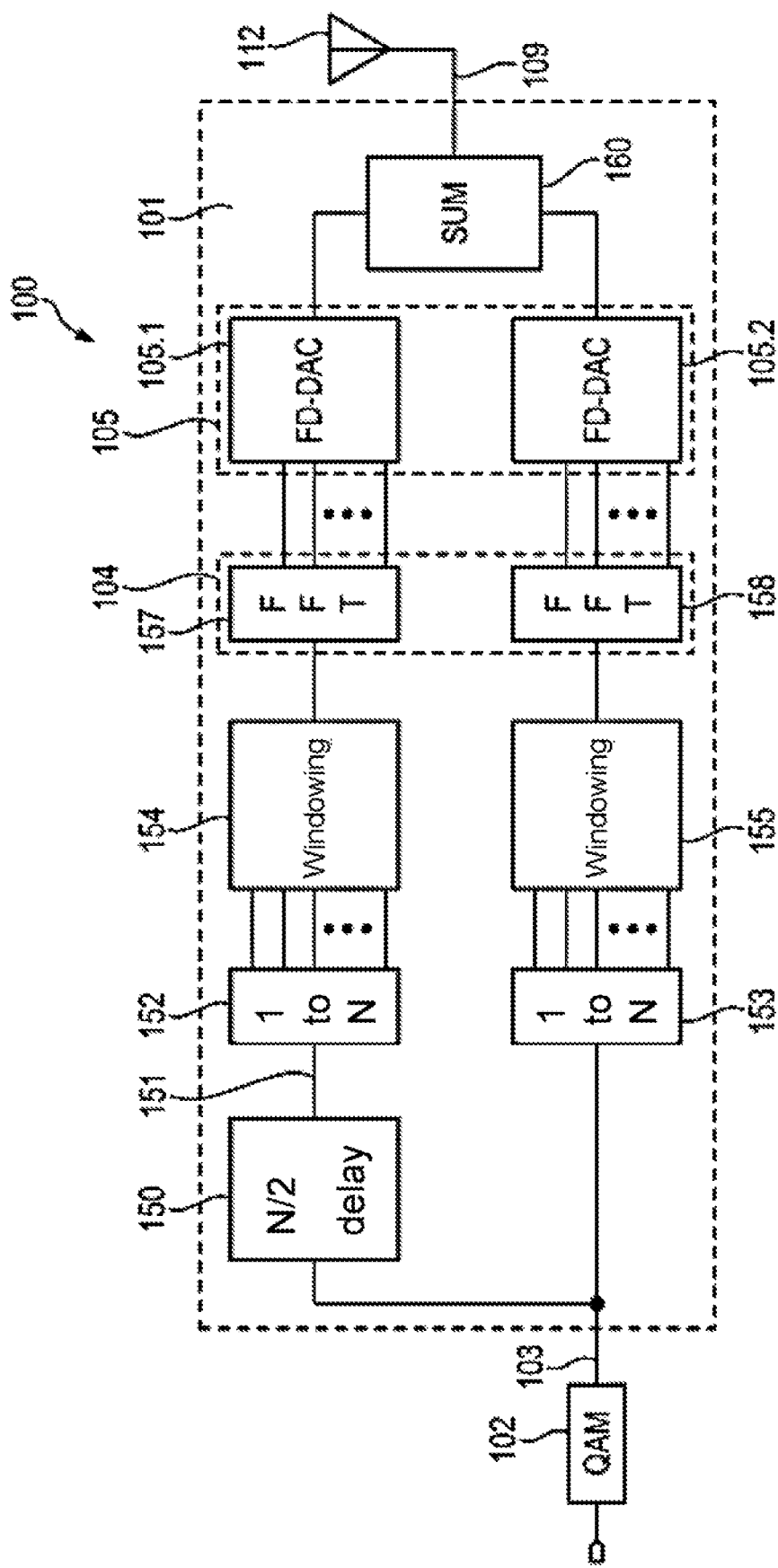
FIG. 7 shows a block diagram of a third exemplary embodiment of a transmission device for transmitting a high-frequency, analog transmission signal according to the invention.

In the synthesis apparatus according to FIG. 6, the Fourier coefficients are first multiplicatively mixed with the first oscillator signal $\cos(f_{LO})$ and the second oscillator signal $\sin(f_{LO})$ that is phase-shifted with respect to the first oscillator signal by 90° before mixing with the first periodic signal $\cos(f_{IF}+i\Delta F)$ generated by means of the DDS apparatus and the second periodic signal $\cos(f_{IF}+i\Delta F)$ takes place. In a modification of the synthesis apparatus 105 shown in FIG. 6, this principle is reversed so that first the mixing with the first periodic signal $\cos(f_{IF}+i\Delta F)$ generated by means of the DDS apparatus and the second periodic signal $\cos(f_{IF}+i\Delta F)$ takes place and in a second step the mixing with the common first oscillator signal $\cos(f_{LO})$ and the common second oscillator signal $\sin(f_{LO})$ FIG. 7 shows a third exemplary embodiment of a transmission device 100 for transmitting a high-frequency, analog transmission signal 109, which is formed as a single-carrier transmission signal. In this respect, said transmission device is a transmission device 100 in the form of an RF transmitter for a single-carrier transmission signal. The transmission device 100 has a modulator 102, a circuit arrangement 101 for generating the high-frequency, analog transmission signal 109 and an antenna 112, by means of which the transmission signal 109 is emitted. In the circuit arrangement 101, particular measures have been taken to reduce undesired effects on the quality of the transmission signal 109. The transmission device 100 according to the third exemplary embodiment uses an additional method step, which precedes the calculation of the discrete frequency spectrum and is also referred to as windowing.

The analysis apparatus 104 of the circuit arrangement 101 is configured as an apparatus for discrete Fourier transformation and has a plurality of, in particular two, transformation units 157, 158. Respective sections of the baseband signal 103 are fed to each of said transformation units 157, 158, which sections correspond to a prescribed window width of N symbols. To this end, the modulated, digital baseband signal 103 is delayed in a delay device 150, in particular by a period that corresponds to half of a window width N. The delay device 150 generates a delayed baseband signal 151. The non-delayed baseband signal 103 is fed to a first series-to-parallel converter 153 and the delayed baseband signal 151 is fed to a second series-to-parallel converter 152.

Figure 8A:
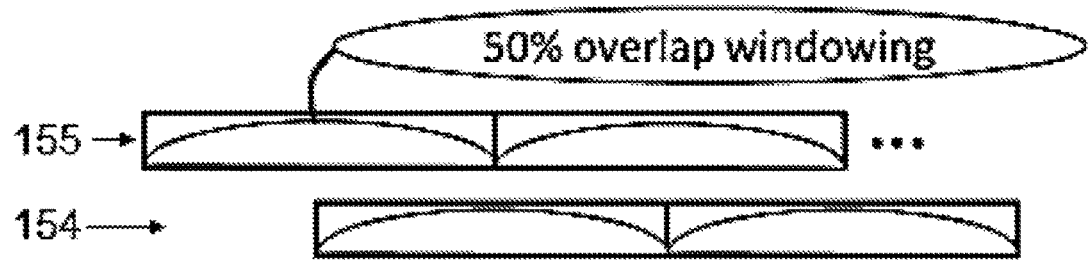
FIGS. 8a and 8b show a schematic illustration to explain the functioning of the transmission device according to FIG. 7.

The baseband signals that are paralleled by the series-to-parallel converters 152, 153 are each fed to a windowing unit 154, 155, in which the paralleled baseband signals are weighted using a prescribed window function, cf. FIG. 8a. The prescribed window function is designed in such a way that the amplitudes of the weighted signals at the edges of the respective window tend toward zero. This means that the window function at the edge of the window has a higher attenuation than in the center of the window. This can reduce the occurrence of discontinuities and/or high-frequency interference in the high-frequency analog transmission signal 109.

The paralleled baseband signals weighted by the windowing units 154, 155 are fed to the analysis apparatus 104.

The transformation units 157, 158 of the analysis apparatus 104 carry out a discrete Fourier transformation of the respective sections of the baseband signal in parallel. In a first transformation unit 158, the baseband signal paralleled in the first series-to-parallel converter 153 and weighted in a first windowing unit 155 is subjected to a discrete Fourier transformation. In a second transformation unit 157, the baseband signal delayed in the delay unit 150, paralleled in the second series-to-parallel converter 152 and weighted in the second windowing unit 154 is subjected to a discrete Fourier transformation. The transformation units 157, 158 each calculate a discrete partial frequency spectrum, which has N Fourier coefficients. The Fourier coefficients constitute a representation of the respective section of the baseband signal 103 in the frequency domain.

Figure 8B:
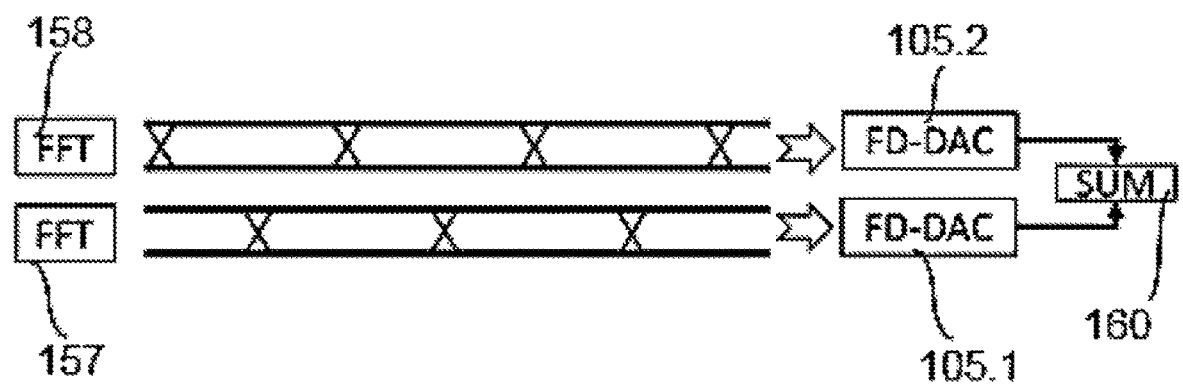

The discrete partial frequency spectrum of the first transformation unit 158 is fed to a first synthesis apparatus element 105.2 of the synthesis apparatus. The discrete partial frequency spectrum of the second transformation unit 157 is fed to a second synthesis apparatus element 105.1 of the synthesis apparatus. The synthesis apparatus elements 105.1, 105.2 can be designed as has been described above in connection with FIGS. 4 to 6. The synthesis apparatus elements 150.1, 150.2 operate in a phase-shifted manner in such a way that the internal signals of the synthesis apparatus elements 150.1, 150.2 of different frequencies are shifted by half of the window length, wherein the window length is the symbol period of the modulation apparatus 102 multiplied by the window length N. The high-frequency, analog single-carrier partial signals generated by the synthesis apparatus elements 105.11, 105.2 are combined to form the high-frequency, analog single-carrier transmission signal 109 by means of a summer, cf. FIG. 8b. In this transmission device 100, no oversampling and no filtering of the baseband signal 103 is required.

Figure 9:
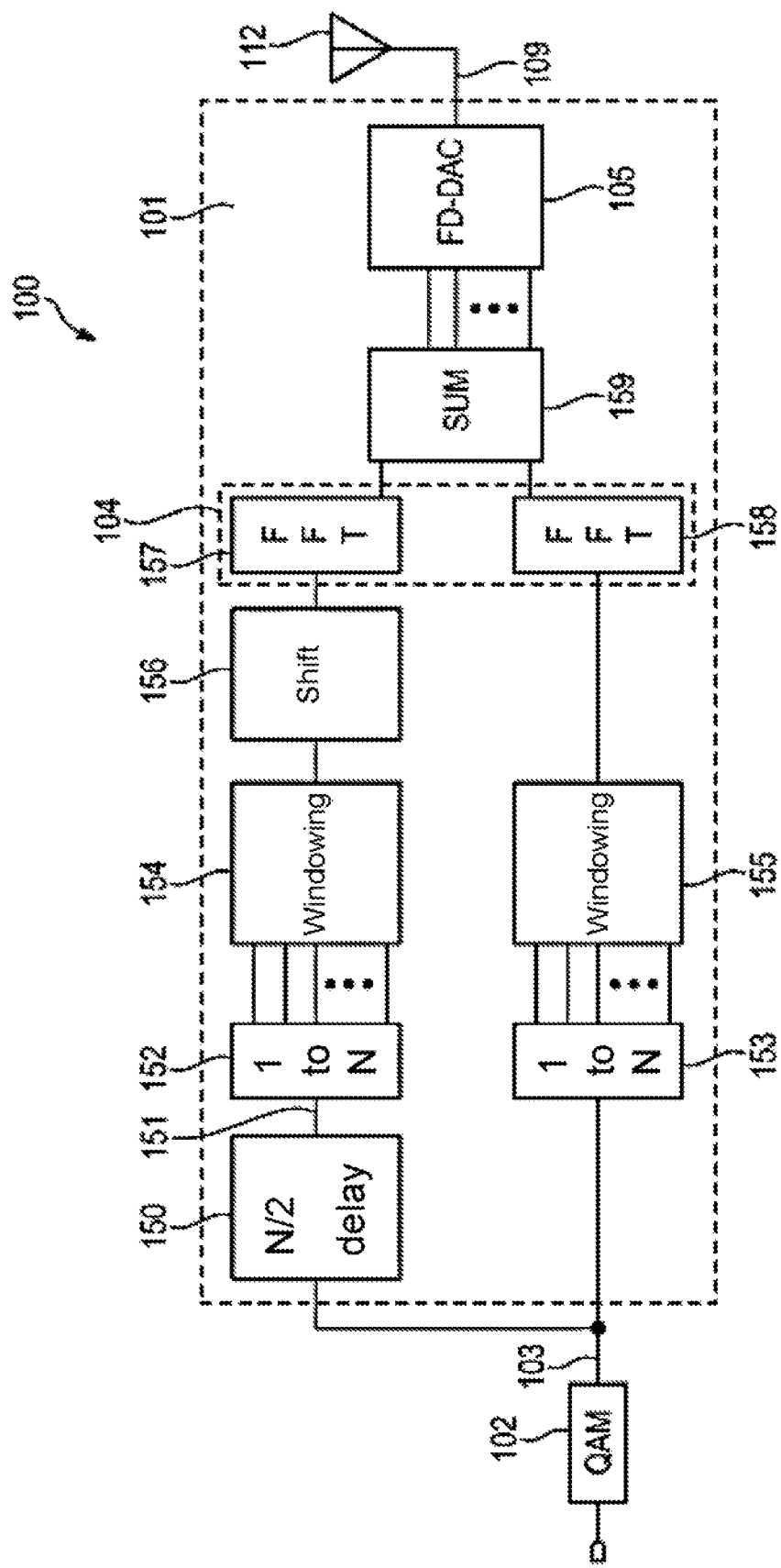
FIG. 9 shows a block diagram of a fourth exemplary embodiment of a transmission device for transmitting a high-frequency, analog transmission signal according to the invention.

FIG. 9 shows a fourth exemplary embodiment of a transmission device 100 for transmitting a high-frequency, analog transmission signal 109, which is formed as a single-carrier transmission signal. In this respect, said transmission device is a transmission device 100 in the form of an RF transmitter for a single-carrier transmission signal. The transmission device 100 has a modulator 102, a circuit arrangement 101 for generating the high-frequency, analog transmission signal 109 and an antenna 112, by means of which the transmission signal 109 is emitted. In the circuit arrangement 101, particular measures have been taken to reduce undesired effects on the quality of the transmission signal 109. The transmission device 100 according to the third exemplary embodiment uses an additional method step, which precedes the calculation of the discrete frequency spectrum and is also referred to as windowing.

The analysis apparatus 104 of the circuit arrangement 101 is configured as an apparatus for discrete Fourier transformation and has a plurality of, in particular two, transformation units 157, 158. Respective sections of the baseband signal 103 are fed to each of said transformation units 157, 158, which sections correspond to a prescribed window width of N symbols. To this end, the modulated, digital baseband signal 103 is delayed in a delay device 150, in particular by a period that corresponds to half of a window width N. The delay device 150 generates a delayed baseband signal 151. The non-delayed baseband signal 103 is fed to a first series-to-parallel converter 153 and the delayed baseband signal 151 is fed to a second series-to-parallel converter 152.

Figure 10A:
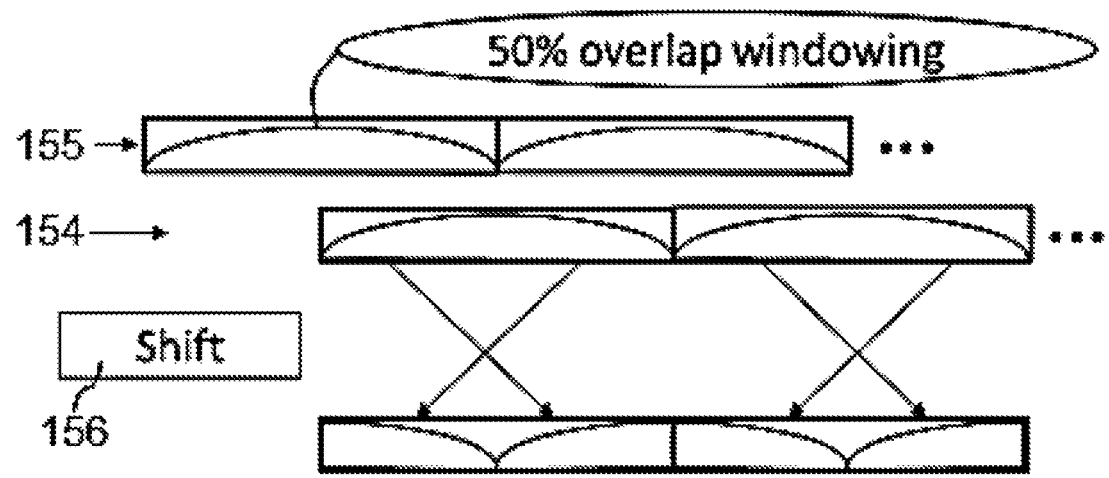
FIGS. 10a and 10b show a schematic illustration to explain the functioning of the transmission device according to FIG. 9.

The baseband signals that are paralleled by the series-to-parallel converters 152, 153 are each fed to a windowing unit 154, 155, in which the paralleled baseband signals are weighted using a prescribed window function, cf. FIG. 10a. The prescribed window function is designed in such a way that the amplitudes of the weighted signals at the edges of the respective window tend toward zero. This means that the window function at the edge of the window has a higher attenuation than in the center of the window. This can reduce the occurrence of discontinuities and/or high-frequency interference in the high-frequency analog transmission signal 109.

Before the paralleled baseband signals weighted by the windowing units 154, 155 are fed to the analysis apparatus 104, a displacement operation of the delayed, weighted, paralleled baseband signals takes place in a displacement unit 156. In the displacement unit 156, the window is divided into a first window half and a second window half and the first window half is interchanged with the second window half, cf. FIG. 10a.

The transformation units 157, 158 of the analysis apparatus 104 carry out a discrete Fourier transformation of the respective sections of the baseband signal in parallel. In a first transformation unit 158, the baseband signal paralleled in the first series-to-parallel converter 153 and weighted in a first windowing unit 155 is subjected to a discrete Fourier transformation. In a second transformation unit 157, the baseband signal delayed in the delay unit 150, paralleled in the second series-to-parallel converter 152, weighted in the second windowing unit 154 and processed in the displacement unit 156 is subjected to a discrete Fourier transformation. The transformation units 157, 158 each calculate a discrete partial frequency spectrum, which has N Fourier coefficients. The Fourier coefficients constitute a representation of the respective section of the baseband signal 103 in the frequency domain.

Figure 10B:
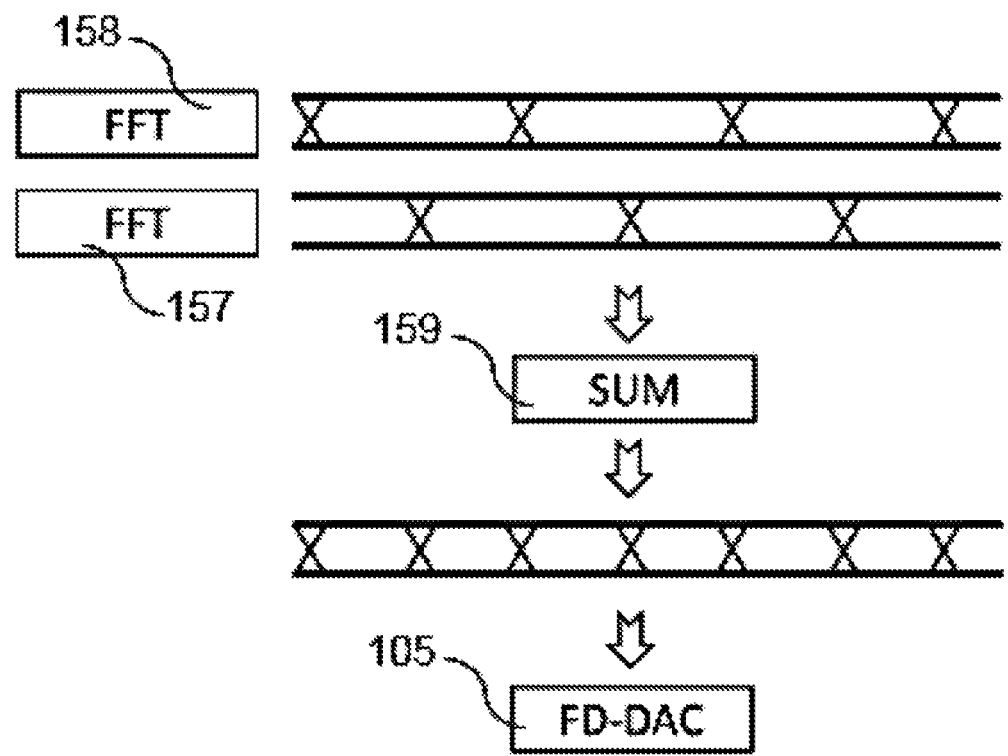

The discrete partial frequency spectra of the transformation units 157, 158 are combined by means of a summer 159, cf. FIG. 10b. The summer 159 generates a discrete frequency spectrum of the baseband signal 103, which is fed to the synthesis apparatus 105. The synthesis apparatus 105 can be designed as has been described above in connection with FIGS. 4 to 6. Only one synthesis apparatus 105 is required. The high-frequency, analog transmission signal 109 generated by the synthesis apparatus 105 is a single-carrier transmission signal having just one carrier. In this transmission device 100, no oversampling and no filtering of the baseband signal 103 is required.

The transmission devices 100 described above for transmitting a high-frequency, analog transmission signal 109, in particular a high-frequency, analog single-carrier transmission signal, have an antenna 112 for transmitting the transmission signal 109 and a synthesis apparatus 105 for generating the high-frequency, analog transmission signal on the basis of a discrete frequency spectrum of a digital, in particular modulated, baseband signal. A circuit arrangement 101, which comprises the synthesis apparatus 105, is provided in each of said transmission devices 100. Said circuit arrangements 101 can be used, for example, to generate a transmission signal, in particular a high-frequency, analog single-carrier transmission signal, according to the standard IEEE 802.11ad (Wireless Gigabit) in a transmission frequency band above 57 GHz, preferably in a range of from 57 GHz to 66 GHz.

LIST OF REFERENCE SIGNS

1 Transmission device
2 Modulation device
3 Baseband signal
4 Sampling apparatus
5 Low-pass filter
6 RF-DAC
7 Digital-to-analog converter
8 Oscillator
9 Mixer
10 Transmission signal
11 Amplifier
12 Analog filter
13 Antenna
100 Transmission device
101 Circuit arrangement
102 Modulator
103 Digital baseband signal
104 Analysis apparatus
105 Synthesis apparatus
105.1 Synthesis apparatus element
105.2 Synthesis apparatus element
106 Modulation device
109 Continuous, analog transmission signal
110 Amplifying device
111 Analog filter
112 Antenna
116 Signal source
117 Weighting device
118 Mixer
150 Delay unit
151 Delayed baseband signal
152 Series-to-parallel converter
153 Series-to-parallel converter
154 Windowing unit
155 Windowing unit
156 Displacement unit
157 Transformation unit
158 Transformation unit
159 Summer 160 Summer
BB Baseband range
BW' Bandwidth of the baseband signal
BW Bandwidth of the transmission signal
$c_0, c_1, \ldots c_{N-1}$ Fourier coefficients

The invention claimed is:

1. A transmission device for transmitting a high-frequency, analog single carrier transmission signal, the transmission device comprising:
   an antenna for transmitting the high-frequency, analog single carrier transmission signal, and
   a synthesis apparatus for generating the high-frequency, analog single carrier transmission signal on a basis of a discrete frequency spectrum of a digital, modulated baseband signal,
   wherein the synthesis apparatus is an apparatus for carrying out a continuous, inverse Fourier transformation.

2. The transmission device as claimed in claim 1, wherein the discrete frequency spectrum has a plurality of Fourier coefficients, which are each assigned to a first frequency in a baseband range, and
   wherein in each case, two first frequencies have a prescribed frequency spacing.

3. The transmission device as claimed in claim 2, wherein the synthesis apparatus has a plurality of signal sources, by means of which periodic signals can be generated at two frequencies in a frequency range that is raised compared to a baseband range,
   wherein in each case, two second frequencies have the prescribed frequency spacing.

4. The transmission device as claimed in claim 3, wherein the synthesis apparatus has a plurality of weighting devices, by means of which a weighting of the plurality of signal sources can be set depending on the discrete frequency spectrum so that a plurality of signal components of the high-frequency, analog single carrier transmission signal can be generated, and
   wherein in each case, two signal components have the prescribed frequency spacing.

5. The transmission device as claimed in claim 3, wherein the raised frequency range is an intermediate frequency range located between the baseband range and the range of transmission frequencies, and
   wherein the synthesis apparatus has a mixer stage, in which the periodic signals at two frequencies can be mixed using an analog oscillator signal generated depending on the discrete frequency spectrum so that a plurality of signal components of the high-frequency, analog single carrier transmission signal can be generated.

6. The transmission device as claimed in claim 3, wherein the signal sources have an apparatus for direct digital synthesis of the periodic signal.

7. The transmission device as claimed in claim 1, wherein the transmission device has an analysis apparatus for calculating the discrete frequency spectrum on a basis of the digital, modulated baseband signal, the analysis apparatus is configured as an apparatus for carrying out a discrete Fourier transformation of the digital, modulated baseband signal.

8. The transmission device as claimed in claim 1, wherein the transmission device has a modulation apparatus for generating the discrete frequency spectrum of the digital, modulated baseband signal on a basis of a digital, unmodulated payload stream.

9. A circuit arrangement for generating a high-frequency, analog single carrier transmission signal, wherein the circuit arrangement has a synthesis apparatus for generating the high-frequency, analog single carrier transmission signal on a basis of a discrete frequency spectrum of a digital baseband signal, and
   wherein the synthesis apparatus is an apparatus for carrying out a continuous, inverse Fourier transformation.

10. Use of the circuit arrangement as claimed in claim 9 for generating the high-frequency, analog single carrier transmission signal in a transmission frequency band above 57 GHz.

11. Use of the circuit arrangement as claimed in claim 9 for generating the high-frequency, analog single carrier transmission signal in a transmission frequency range from 57 GHz to 66 GHz.

12. A method for transmitting a high-frequency, analog single transmission signal that is a high-frequency, analog single-carrier transmission signal, the method comprising:
   providing a discrete frequency spectrum of a digital baseband signal;
   generating the high-frequency, analog single carrier transmission signal on a basis of the discrete frequency spectrum by means of an apparatus for carrying out a continuous, inverse Fourier transformation; and
   transmitting the high-frequency, analog single carrier transmission signal by means of an antenna.

13. The method as claimed in claim 12, wherein the method comprises:
   calculating the discrete frequency spectrum of the digital baseband signal on the basis of the digital baseband signal by means of a discrete Fourier transformation to provide the high-frequency, analog single carrier transmission signal.

14. The method as claimed in claim 13, wherein the calculating step is preceded by windowing of the digital baseband signal.

15. The method as claimed in claim 14, wherein a plurality of temporally overlapping sections of the baseband signal are used to calculate the discrete frequency spectrum.

16. The method as claimed in claim 12, wherein the method comprises:
   generating the discrete frequency spectrum of the digital baseband signal proceeding from a digital payload stream to provide the high-frequency, analog single carrier transmission signal.

17. The method as claimed in claim 12, wherein the discrete frequency spectrum has a plurality of Fourier coefficients, which are each assigned to a first frequency in a baseband range,
   wherein in each case two first frequencies have a prescribed frequency spacing,
   wherein periodic signals are generated at two frequencies in a frequency range that is elevated compared to the baseband range,
   wherein in each case two second frequencies have the prescribed frequency spacing,
   wherein signal components of the high-frequency, analog single carrier transmission signal are generated on the basis of the periodic signals and the Fourier coefficients, and
   wherein in each case two signal components have the prescribed frequency spacing.

18. The method as claimed in claim 17, wherein the raised frequency range is a transmission frequency range, and the generated signal components are summed to generate the high-frequency, analog single carrier transmission signal.

19. The method as claimed in claim 17, wherein the frequency range that is elevated is an intermediate frequency range located between the frequency range of the baseband signal the frequency range of the transmission signal,
wherein a common oscillator signal is additionally used to generate the signal components of the high-frequency, analog single carrier transmission signal, and
wherein the frequency of the common oscillator signal is located in a range below the frequency range of the transmission signal.

* * * * *